Figure 1:
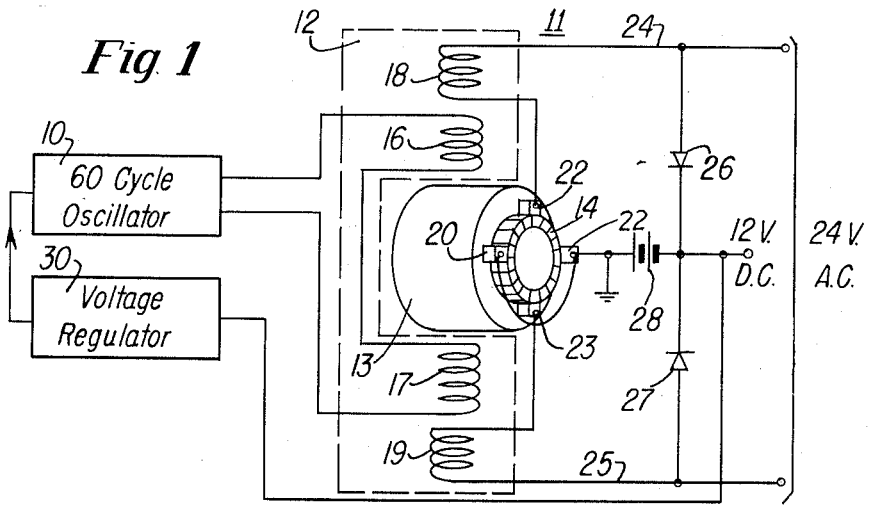

Feb. 6, 1962  R. T. RACE  3,020,466
ELECTRIC GENERATOR
Filed Dec. 30, 1959

INVENTOR.
Richard T. Race.
BY Mueller & Aichele
ATTYS.

United States Patent Office 3,020,466
Patented Feb. 6, 1962

3,020,466
ELECTRIC GENERATOR
Richard T. Race, Chicago, Ill., assignor to Motorola, Inc., Chicago, Ill., a corporation of Illinois
Filed Dec. 30, 1959, Ser. No. 862,831
5 Claims. (Cl. 322—28)

This invention relates generally to automobile electrical systems and more particularly to such a system having a rotary magnetic amplifier and providing both direct and alternating current supplies.

Automobiles have commonly used direct current electrical systems which include a generator as the electrical source for cranking the engine, ignition and for various accessories such as lights, horns, radios, indicators, and so forth. These systems were entirely satisfactory when the electrical requirements were small but, as the electrical requirements of automobiles have increased, the capacity of such low voltage direct current systems is not adequate. In an attempt to improve this situation, automobiles have changed from 6 to 12 volt systems but this still has not been entirely satisfactory. Many accessories such as air conditioners can be operated more effectively from alternating current and by using higher voltage the losses in the circuits are greatly reduced.

It has been proposed to use alternators for automobile electrical systems but the systems used have included rectifiers to convert the alternating current to direct current. Inasmuch as the frequency of an alternator will change with the speed of operation and, as the speed of an automobile engine changes through a wide range for various conditions of operation, an alternator driven thereby will have an alternating current output which varies widely in frequency. This renders it unsatisfactory for appliances and induction motors designed for alternating current of a fixed frequency. Therefore the output of such alternators have been rectified to provide direct current and the previous problems of direct current energization are encountered.

It is, therefore, an object of the present invention to provide an automobile electrical system which provides a relatively constant and large electrical power output as the automobile engine operates through a wide range of speeds.

It is another object of the invention to provide a dynamo-electric device driven by an automobile engine at various speeds which furnishes a large alternating current output having substantially constant frequency.

A further object of the invention is to provide an automobile electrical system powered by the automobile engine which provides direct current for charging the battery and operating the engine and certain accessories, and which provides alternating current for operating electrical accessories consuming large amounts of power.

Still another object of the invention is to provide an automobile electrical system which furnishes alternating current of substantially constant frequency and voltage in the presence of changes of in the load applied thereto and changes in engine speed.

A feature of the invention is the provision of an automobile electrical system including a control oscillator which furnishes an alternating electrical current of the desired frequency and a rotary magnetic amplifier driven by the automobile engine and excited by the alternating current, and which provides an alternating current output of the same frequency but with greatly increased current capacity. A control system may be coupled to the output of the amplifier for controlling the oscillator output to provide the required excitation for the amplifier to hold its output voltage substantially constant.

Another feature of the invention is the provision of a rotary magnetic amplifier adapted to be driven by an automobile engine, and having short circuited rotor windings which are grounded and a pair of compensating stator windings connected in an output circuit so that the amplifier provides alternating current balanced with respect to ground, with a pair of rectifiers connected to the balanced output of the amplifier in a full wave circuit, to furnish a direct current output. The electrical system, therefore, has both a direct current output and an alternating current output furnishing substantially twice the voltage of the direct current output.

Figure 2:
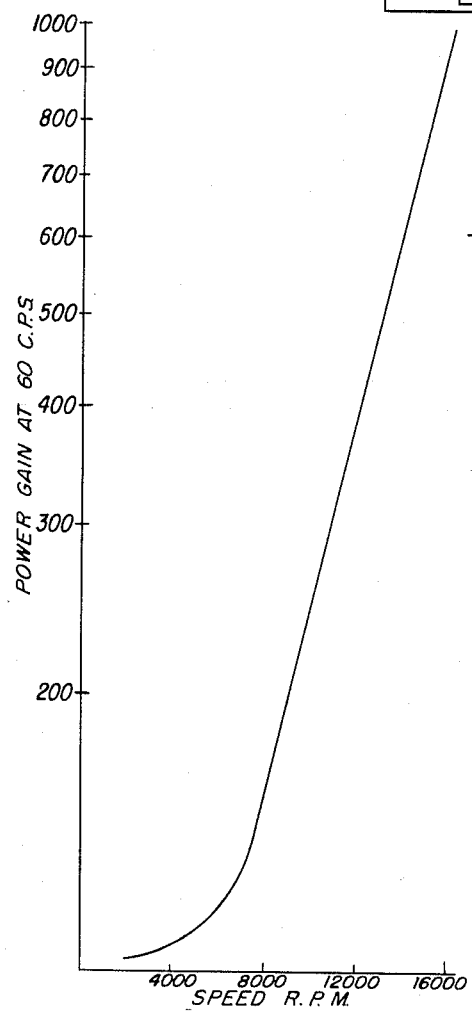

Further objects, features, and the attending advantages of the invention will be apparent upon consideration of the following description when taken in conjunction with the following drawings, in which:

FIG. 1 is a circuit diagram showing the electrical system in accordance with the invention; and FIG. 2 is a curve showing the power gain which may be obtained with the system.

In practicing the invention, there is provided a system for furnishing electrical energy for use in an automobile. The system includes a 60-cycle supply, which may be a transistor oscillator, and a rotary magnetic amplifier for increasing the 60-cycle current and having a stator with windings energized by the oscillator. The amplifier rotor is driven by the automobile engine and includes windings connected to a commutator. A first set of brushes engages the commutator at opposite positions thereon. These brushes are connected together to a reference point to effectively short circuit windings connected through the brushes. A second set of brushes is connected at substantially right angles to the first set of brushes for providing the amplifier output. The output circuit includes a pair of compensating windings on the stator connected in series individually with the brushes of the second set to buck out the field produced by the output current. The output is an alternating current, preferable at 24 volts, balanced with respect to the reference point, which may be used to operate accessories in the automobile. Direct current may be obtained from the output by a full wave rectifier circuit including a pair of rectifiers connected to the output circuit so that the common point of the rectifiers provides a direct current potential having a voltage substantially half that of the alternating current output. This provides the 12-volt commonly used in automobile electrical systems. The magnetic amplifier retains the frequency of the oscillator so that a 60-cycle output is provided. A regulator circuit may be connected to the direct current output for controlling the amplitude of the oscillator to provide the required excitation to hold the output voltage at the required value in the presence of changes in speed of the automobile engine and in the presence of changes in the load.

I claim:

Referring now to the drawings, in FIG. 1 there is shown a schematic diagram of the system in accordance with the invention. The 60-cycle oscillator 10 is shown as a block diagram since this may be an oscillator of any suitable construction. For example, it may be a transistor oscillator or an oscillator including a vibrator establishing the frequency. The oscillator provides excitation for a rotary magnetic amplifier 11 including a stator 12 generally indicated by the dotted lines. A rotor 13 is mechanically coupled to the automobile engine and is driven thereby to provide rotation with respect to the stator. The rotor includes windings which are connected to a commutator 14 of the type used in a direct current generator. The alternating current from the 60-cycle oscillator is applied to the control or exciting windings 16 and 17 on the stator which are connected in series.

Operating on the commutator 14 are two sets of brushes, the first set including brushes 20 and 21 which are positioned substantially on opposite sides of the commutator. These brushes are interconnected to provide a short circuit through the winding sections connected to the commutator segments engaged thereby. The brushes may also be connected to a reference potential and are shown connected to ground in the drawing. A second set of brushes includes brushes 22 and 23 which are positioned substantially at right angles to the brushes 20 and 21. The brushes 22 and 23 provide the load current and are connected to the output circuit of the amplifier. Windings 18 and 19 in the stator are connected in the output circuit and these serve as compensating windings to buck out the effect of the load current on the field.

In the operation of the device, the magnetic amplifier acts as a two-stage amplifier to thereby provide extremely high gain. The current through the short circuited winding sections provides a very strong field which induces the load current in the winding sections positioned at 90-degrees to the short circuited winding sections. However, the load current provides a field which opposes the field of the control windings 16 and 17. To compensate for this, the windings 18 and 19 produce fields which are substantially equal and opposite to the field produced by the load current through the armature winding sections connected by the segments in engagement with the brushes 22 and 23. Accordingly, the effect of the load current on the field is balanced out and the load current is controlled by the exciter windings 16 and 17.

The compensating windings 18 and 19 are connected in a balanced manner so that the alternating voltage between the conductors 24 and 25 is balanced with respect to ground. For automotive use, the alternating current voltage across the output lines 24 and 25 may be of the order of 24 volts. The amplifier provides a large amount of power so that this 24-volt alternating current supply may be used to energize various elements in an automobile which require substantial power. If it is desired to use 110-volt accessories, a simple transformer may be used to convert the 24-volt A.C. to 110 volts. It is entirely possible, however, to operate the accessories by use of motors energized from 24 volts A.C.

In order to provide a voltage for the electrical system of the vehicle and for charging the battery, rectifiers may be connected to the A.C. output. This is illustrated by rectifiers 26 and 27 connected to the leads 24, 25. These rectifiers provide full wave rectification with respect to ground so that 12 volts is provided for charging the battery 28. This is the voltage commonly used in automobile electrical systems and, in addition to charging the battery, this can be used for ignition, lights, starter, etc.

As previously stated, the rotor 13 is driven by the automobile engine and, accordingly, will be driven at varying speeds depending upon whether the engine is idling or is operated at a driving speed. The rotary amplifier increases the 60-cycle current furnished by the oscillator 10 and maintains the frequency constant regardless of the speed of rotation. The output voltage provided by the amplifier will tend to vary with the speed of rotation and to provide a substantially constant voltage with variations in the speed, and with variations in the load applied to the system, a voltage regulator 30 is provided. The voltage regulator may operate from the 12-volt supply provided by the rectifiers and is coupled to the oscillator 10 to control the amplitude of the alternating current applied by the oscillator to the control windings of the rotary amplifier. This regulator may control the gain of the output stage of the oscillator or may control the amplitude of the alternating current applied to the rotary amplifier in any desired manner.

In FIG. 2 there is illustrated a curve showing the operation of the electrical system including the magnetic amplifier. Although the power gain increases greatly with speed, sufficient gain is available at low speed to meet the minimum requirements. At the normal operating speed of the automobile engine sufficient power is provided for the required accessories.

The provision of an alternating current supply in an automobile has great advantages in operation of many accessories. For example, air conditioning equipment operated by alternating current can use a hermetically sealed motor-compressor unit, as is used in home air conditioning units. This has the advantages of longer life, less maintenance and more efficient operation, as compared to a compressor driven directly from the automobile engine or a direct current driven compressor which cannot be hermetically sealed. The alternating current operated compressor can also be located at any desired position whereas a unit mechanically driven from the engine must be coupled to the fan belt or other element driven by the engine. By having alternating current available, small motors for ventilating fans, windshield wipers and other accessories can be of the alternating current type which are much more satisfactory than direct current motors.

Because of the large alternating current output which may be provided by the system, the automobile generator can be used as an emergency power supply. As previously stated, the output may be stepped up to 115 volts so that the generator can supply the current required to operate household equipment such as heating plants, freezers, sump pumps and other items where it is important that the operation continue under emergency conditions. The generator can also supply power for operating tools which may be located where regulator power lines are not available.

1. A dynamo-electric machine having a fixed stator and a rotor adapted to be rotated with respect to said stator at speeds which vary through a substantial range, said rotor having windings thereon and a commutator connected to the windings, a first pair of brushes engaging said commutator at substantially opposite positions and with said brushes being interconnected with each other and connected to a reference potential point, a second pair of brushes engaging said commutator at substantially opposite positions intermediate the positions of said brushes of said first pair, a pair of control windings on said stator, means for applying an alternating current to said control windings, a pair of compensating windings on said stator, a pair of output terminals, an output circuit including first and second portions each connected between one of said output terminals and one brush of said second pair and each including one of said compensating windings, said output circuit providing an alternating current at said output terminals which is balanced with respect to the reference potential point, and control circuit means responsive to the voltage in said output circuit for controlling the voltage of the alternating current applied to said control windings, whereby such alternating current appears in amplified form in said output circuit and the voltage and frequency at said output terminals remain substantially constant with variations in the speed of rotation of said rotor.

2. A dynamo-electric machine having a fixed stator and a rotor adapted to be rotated with respect to said stator at speeds which vary through a substantial range, said rotor having windings thereon and a commutator connected to the windings, a first set of brushes engaging said commutator at substantially opposite positions and with said brushes being interconnected with each other and connected to a reference potential point, a second set of brushes engaging said commutator at substantially opposite positions intermediate the positions of said brushes of said first set, a pair of control windings on said stator, means for applying an alternating current to said control windings, a pair of compensating windings on said stator, an output circuit including first and second portions each connected to one brush of said second set and each including one of said compensating windings, said output circuit providing an alternating current which is balanced with respect to the reference potential point, rectifier means connected between said output circuit and the reference point providing a direct current output, and control circuit means responsive to the voltage of said output circuit for controlling the voltage of the alternating current applied to said control windings, whereby the amplified current in said output circuit has a voltage and frequency which remains substantially constant with variations in the speed of rotation of said rotor.

3. A dynamo-electric machine having a fixed stator and a rotor adapted to be rotated with respect to said stator at speeds which vary through a substantial range, said rotor having windings thereon and a commutator connected to the windings, a first pair of brushes engaging said commutator at substantially opposite positions and with said brushes being interconnected with each other and connected to a reference potential point, a second pair of brushes engaging said commutator at substantially opposite positions intermediate the positions of said brushes of said first pair, a pair of control windings on said stator, means for applying an alternating current to said control windings, a pair of compensating windings on said stator, an output circuit including first and second portions each connected to one brush of said second pair and each including one of said compensating windings, said output circuit providing an alternating current which is balanced with respect to the reference potential point, full wave rectifier means connected between said output circuit and the reference point providing a direct current output, and control circuit means responsive to the voltage of said direct current output for controlling the voltage of the alternating current applied to said control windings, whereby such alternating current appears in amplified form in said output circuit with the voltage and frequency at said output circuit remaining substantially constant with variations in the speed of rotation of said rotor member.

4. An electric current generating system for an automobile having a variable speed engine, said system including in combination, a low power fixed frequency alternating current source, a magnetic amplifier having a fixed stator and a rotor adapted to be rotated with respect to said stator, means connecting said rotor to the automobile engine for driving said rotor at speeds which vary through a substantial range, said rotor having windings thereon and a commutator connected to the windings, a first pair of brushes engaging said commutator at substantially opposite positions thereon, said brushes being interconnected with each other and connected to a reference potential point, a second pair of brushes engaging said commutator at substantially opposite positions intermediate the positions of said brushes of said first pair, a pair of control windings on said stator, means for applying current from said alternating current source to said control windings, a pair of compensating windings on said stator, an output circuit including first and second portions each connected to one brush of said second pair and each including one of said compensating windings, said output circuit providing alternating current which is balanced with respect to the reference potential point, and control circuit means coupled to said alternating current source and to said output circuit and responsive to the voltage in said output circuit, said control circuit means controlling the voltage applied by said alternating current source to said control windings so that the voltage and frequency of said alternating current in said output circuit remains substantially constant with variations in the speed of rotation of said rotor.

5. An electric current generating system for an automobile having a battery and a variable speed engine, which system includes in combination, a low power fixed frequency alternating current source, a magnetic amplifier having a fixed stator and a rotor adapted to be rotated with respect to said stator means connecting said rotor to the automobile engine for driving said rotor at speeds which vary through a substantial range, said rotor having windings thereon and a commutator connected to the windings, a first pair of brushes engaging said commutator at substantially opposite positions, said brushes being interconnected with each other and connected to a reference potential point, a second pair of brushes engaging said commutator at substantially opposite positions intermediate the positions of said brushes of said first pair, a pair of control windings on said stator, means for applying current from said alternating current source to said control windings, a pair of compensating windings on said stator, an output circuit including first and second portions each connected to one brush of said second pair and each including one of said compensating windings, said output circuit providing alternating current which is balanced with respect to the reference potential point, rectifier circuit means connected between said output circuit and the reference point providing a direct current output, means coupling said rectifier circuit means to the battery for charging the same, and voltage regulator means coupled to said alternating current source to said rectifier circuit means and responsive to the direct current voltage thereof, said control circuit means controlling the voltage applied by said alternating current source to said control windings so that the voltage and frequency of said alternating current in said output circuit remains substantially constant with variations in the speed of rotation of said rotor.

References Cited in the file of this patent
UNITED STATES PATENTS

| | | |
|---|---|---|
| 2,483,151 | Pringle | Sept. 27, 1949 |
| 2,664,539 | Petit | Dec. 29, 1953 |